May 14, 1935.     A. C. KEHRLE     2,001,463

BEE FEEDER

Filed Oct. 11, 1933

INVENTOR.
Adam C. Kehrle,
By: Smith, Michael & Gardiner, Attys.

Patented May 14, 1935

2,001,463

UNITED STATES PATENT OFFICE 2,001,463

BEE FEEDER

Adam Carl Kehrle, Buckfastleigh, England

Application October 11, 1933, Serial No. 693,188
In Great Britain March 27, 1933

10 Claims. (Cl. 6—5)

This invention relates to bee feeders incorporating or intended for use in conjunction with a receptacle (for example a tray) for syrup or other liquid or semi-liquid bee food as distinct from candy and other foods of solid form.

The principal object of the invention is to provide an improved bee feeder of the above general type which will enable the rate of feed to be controlled. In this connection it is a well known fact that bees require more feeding during certain seasons of the year than at other times.

A further object is to provide in a bee feeder of the improved construction referred to a form of food tray which will possess certain advantages hereinafter identified.

With the first of these objects in view, a bee feeder according to this invention comprises means for varying the effective area of feeding space at the surface of the food from an area permitting a plurality of bees to feed simultaneously to an area permitting one bee only to feed at a time.

Obviously, the improved feeder may take any of a variety of forms. According to a preferred form, however, it comprises a block to upstand from the surface of the food and is formed with a passage-way for the bees leading from the interior of the hive to the exterior of the block at the surface of the food, and a cap to fit over the block and occupy thereon a plurality of positions selectively, which cap is adapted, according to its position, differentially to control as above the effective width of the passage-way at the surface of the food.

Thus, conveniently, the said passage-way may extend at the food end down the side face of the block, the cap dipping into the food at its lower edge so as to seal the passage-way down said side face of the block from the space above the main body of food surrounding the feeder.

In a simple and preferred form of the invention, the passage-way in the block leads to two separate feeding space zones along the surface of contact of the food with the side face of the block and the cap is arranged to have two positions upon the block in one of which it closes off the wider of the two feeding space zones from access by the bees in the passage-way while opening the other (single bee) zone thereto and in the other position it opens both feeding zones. Alternatively, the cap in the second position may close the zone which was open in the first position, i. e. the single bee zone while opening the other zone. In the slow-feed (single bee) setting of the feeder, only one bee at a time can gain access to the feeding space and feed thereat, each bee, having fed, being compelled to leave the feeding space before another bee can gain access thereto.

Conveniently, to this end, the passage-way in the upstanding block may be constituted at the food end by a groove extending down the side face of the block and of such uniform cross-sectional area as to permit of the passage of one bee only at a time along the groove and the feeding of one bee only at a time at the surface of the food at whatever level this may be at the time up the groove.

Further, in the preferred form of the invention, the passage-way extends vertically through the block from the base end thereof to the top, communicating at said base end with the interior of the hive through an aperture in the bottom of the food tray and at the top with the feeding space zone or zones.

In this event, the block may either be constructed separately from the bottom of the tray or may be formed integral therewith, the tray and block being moulded, for example, from papier mâché, synthetic resin or the like. Alternatively, the block may be fitted over a tubular member or neck upstanding from the bottom of the tray and integral therewith. By having the block integral with the bottom of the tray or by mounting it upon an upstanding neck integral therewith, the advantage is gained, as will be appreciated, that owing to the absence of a joint in the bottom of the tray there is avoided the possibility of leakage of food from within the food tray to the interior of the hive beneath.

The invention will now be further described with reference to the accompanying drawing, which illustrates a preferred embodiment by way of example and in which Figure 1 is a perspective view of the improved bee feeder incorporated with a food tray;

Like reference characters indicate like parts in the several figures.

Figure 1:
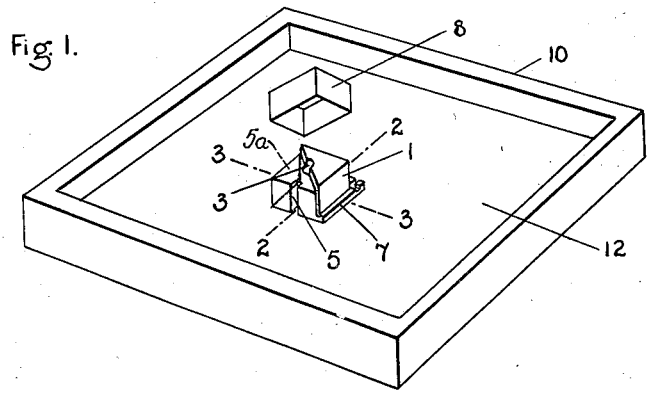

In the construction illustrated, the improved feeder comprises a block 1 projecting upwardly from the surface of a food tray 2, the block being formed with a substantially central vertical hole 3 disposed above a hole 4 provided in the bottom of the food tray.

The food tray is arranged to be mounted in position upon the hive proper or brood chamber beneath the usual cover, the bees, in order to obtain access to the syrup or other food in the tray, having to make their way upwardly through the holes 4, 3.

A groove 5 is formed in one of the side faces of the block 1, this groove being disposed substantially vertically and extending from the upper edge of the block to the upper surface of the bottom of the food tray. The block 1 is also cut away, as at 6, over substantially half its upper surface and is provided with a lip or flange 7 extending along two of its lower edges.

Figures 2, 3:
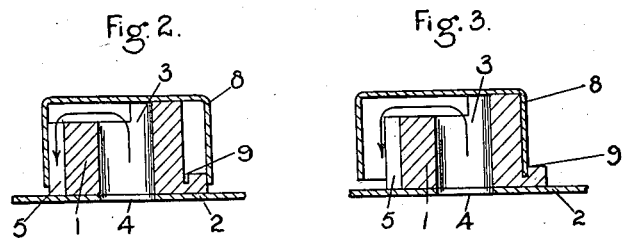
Figure 2 is a cross section taken on the line 2—2 of Figure 1 and drawn to a larger scale than that figure, showing the parts of the feeder in the positions they occupy in the slow-feed setting.
Figure 3 is a similar cross section showing the parts in the rapid-feed setting.
Figures 4, 5:
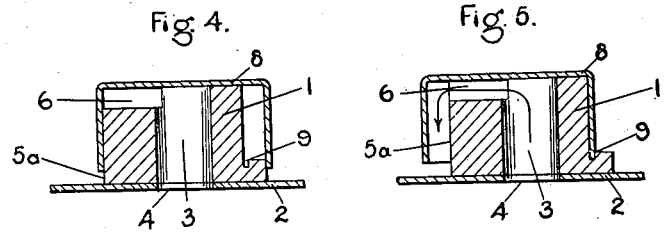
Figure 4 is a cross section corresponding to Figure 2 but taken on the section line 3—3 of Figure 1.
Figure 5 is a cross section corresponding to Figure 3, but taken on the section line 3—3 of Figure 1.

A metal cap 8 is adapted to fit over the block and to occupy either the position shown in Figures 2 and 4 or that shown in Figures 3 and 5, the lower edge of the cap, when the latter is in the position shown in Figures 3 and 5, entering a groove 9 provided to receive it in the upper face of the flange 7.

The walls of the groove 5 above the surface of the food at whatever level this may be in the groove, constitutes a zone of feeding space for the bees, the said zone being reached by the bees via the cut-away 6 at the top of the block.

The side face of the block adjacent to the side face in which the groove 5 is formed and also bounding at its upper edge one side of the cut-away 6 at the top of the block, that is to say the side face marked 5a, constitutes at the surface of the food in the tray, with the other side face in which said groove 5 is formed, a second feeding space zone for the bees, this zone also being reached via the cut-away 6, but only when the cap 8 is in the alternative position shown in Figures 3 and 5.

It will be seen upon reference to Figures 2 to 5 that whilst when the cap is in the position shown in Figures 2 and 4 the first of the aforesaid feeding space zones only is open for access by the bees via the cut-away 6, the other zone being closed off from the cut-away by the side walls of the cap adjacent said side faces of the block, when the cap is in the alternative position shown in Figures 3 and 5 both of the said zones of feeding space are open to the cut-away so that bees may feed at both zones simultaneously.

It will further be observed that the whole width of the side face 5a of the block and also the whole width of the adjacent side face in which the groove 5 is situated, and the groove as well, is available to the bees at the surface of the syrup in the tray so that several bees at a time may feed in this zone, and that in addition the whole width of the grooved face of the block is also available as a feeding space, whereas the groove 5 is of such cross-sectional area as to permit of only one bee at a time passing along it from the cut-away 6 and feeding at the surface of the food. The slow-feed position of the cap 8 therefore is the position shown in Figures 2 and 4, the rapid-feed position being that shown in Figures 3 and 5.

The block, if constructed separately from the tray, as in Figures 2 to 5 for instance, may be secured in position upon the bottom of the tray by any convenient attachment means, for example screws screwing up into the block from the underside of the tray.

The tray is formed with an upstanding flange 10 all around the side as shown, upon which flange the cover of the hive is arranged to rest. This flange and the bottom of the tray may either be formed separately and appropriately secured together, for example again by screws passing up into the flange from the underside of the tray bottom, or integrally, in which latter case the flange and the bottom of the tray may be cast or moulded of some suitable material such as synthetic resin, papier-mâché or the like.

Figure 6:
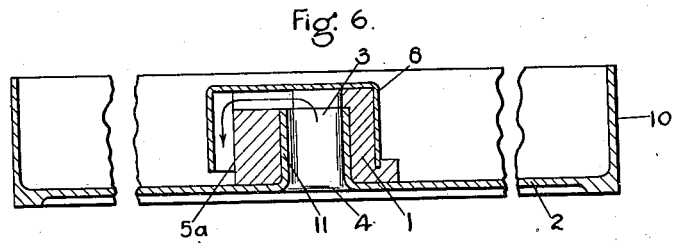
Figure 6 is a horizontal section through an alternative form of food tray with the upstanding block and cap of the previous figures incorporated.

Referring now to Figure 6, the block and cap elements of the feeder are the same as those of the previous figures. The food tray is formed with an upstanding neck 11 around the opening 4 in the bottom of the tray, which neck enters the vertical hole 3 in the block. With this construction, as will be appreciated, leakage of syrup from within the tray down into the hive below is prevented. At the same time the necessity for screwing the block in position upon the bottom of the tray is avoided, and the said neck 11 serves moreover as a locating element for the block relatively to the hole 4.

In this construction (Figure 6) the whole of the food tray, including the bottom, the side flange and the upstanding neck 11, is formed in one integral piece by moulding or pressing.

If desired, also, the block 1 may in this construction be moulded or pressed integral with the tray or tray bottom.

In any event, whether the block be formed integrally with the tray or separately, it may conveniently be made by moulding or pressing, the component material being, for example, papier-mâché or a moulding powder or composition, such as synthetic resin.

Alternatively, wood or even metal may be employed as the component material, either of the tray or of the block, although it is preferable to use a material which, unlike metals in the main, possesses a low coefficient of conduction of heat.

The block 1 may if desired, instead of being positioned in the centre of the tray as shown, be situated to one side of the centre to adapt the feeder for use with a hive which is not level.

It will be obvious to those conversant with the art that the invention is capable of considerable variation as regards form of parts and general design without departure from the general principle and spirit of the invention, and it is to be understood that although the foregoing specific embodiment and constructional form of the invention constitutes a preferred arrangement, by reason principally of its extreme simplicity and yet proved efficiency, the scope of the invention is broad and embracive of all other equivalent embodiments within the limits of the following claims.

What I claim and desire to secure by Letters Patent of the United States is:—

1. In a bee feeder of the kind specified, a block to upstand from the surface of the food and formed with a passageway for the bees leading from the interior of the hive to the exterior of the block at the surface of the food, and a cap to fit over the block and occupy thereon a plurality of positions selectively, which cap is adapted, according to its position, differentially to control the effective width of the passage-way at the surface of the food from a width permitting a plurality of bees to feed at said surface simultaneously to a width permitting one bee only to feed thereat at a time.

2. In a bee feeder of the kind specified, a block to upstand from the surface of the food and formed with a passage-way for the bees leading from the interior of the hive to the exterior of the block at the surface of the food, extending at the food end down the side face of the block, and a cap to fit over the block and occupy thereon a plurality of positions selectively, dipping into the food at its lower edge so as to seal the passage-way down the side face of the block from the space above the main body of food surrounding the feeder block, which cap is adapted, according to its position, differentially to control the effective width of the passage-way at the surface of the food from a width permitting a plurality of bees to feed at said surface simultaneously to a width permitting one bee only to feed thereat at a time.

3. A bee feeder as specified in claim 2, wherein the passage-way in the upstanding block is constituted at the food end by a groove extending down the side face of the block and of such uniform cross-sectional area as to permit of the passing of one bee only at a time along the groove and the feeding of one bee only at a time at the surface of the food in the groove.

4. A bee feeder as specified in claim 2, wherein the passage-way in the block leads to two separate feeding space zones extending along the surface of contact of the food with the side face of the block, one of said zones being of such area as to permit of several bees feeding at a time at this zone and the other zone being of such area as to permit of one bee only feeding at a time at it, the cap being arranged to have two positions upon the block in one of which it closes off the first of the above zones from access by the bees in the passage-way while opening the other zone thereto and in the other position it opens both zones, and that portion of the passage-way which is immediately adjacent said other zone being of such cross sectional area as to permit of the passing of one bee only at a time along it.

5. A bee feeder as specified in claim 1, incorporating a food tray formed integral with the block and having its bottom formed with a neck upstanding therefrom around the edge of a hole in the bottom of the tray which hole constitutes the inlet into the feeder from the hive below the tray, the said neck fitting into a hole provided in the block to receive it and constituting the entrance end of the passage-way for the bees through the block to the feeding space at the surface of the food.

6. A bee feeder as specified in claim 2, wherein the passage-way in the block leads to two separate feeding space zones situated along the surface of contact of the food with the side face of the block and of two different widths respectively, permitting in one zone one bee only to feed at a time and in the other zone a plurality of bees to feed simultaneously, and the cap being arranged to have two positions upon the block, in one of which it closes off the wider zone from the passage-way while opening the other zone thereof and in the other position it opens both zones.

7. A bee feeder as specified in claim 2, wherein the passage-way in the block leads to two separate feeding space zones situated along the surface of contact of the food with the side face of the block and of two different widths respectively, permitting in one zone one bee only to feed at a time and in the other zone a plurality of bees to feed simultaneously, and the cap being arranged to have two positions upon the block, in one of which it closes off the wider zone from the passage-way while opening the other zone thereof and in the other it opens the first mentioned zone and closes the other.

8. A bee feeder as specified in claim 2, wherein the passage-way in the block leads to two separate feeding space zones extending along the surface of contact of the food with the side face of the block, one of said zones being of such area as to permit of several bees feeding at a time at this zone and the other zone being of such an area as to permit of one bee only feeding at a time at it, the cap being arranged to have two positions upon the block, in one of which it closes off the first of the above zones from access by the bees in the passage-way while opening the other zone thereto and in the other position it opens the first of the zones and closes the other, and that portion of the passage-way which is immediately adjacent said other zone being of such cross-sectional area as to permit of the passing of one bee only at a time along it.

9. A bee feeder as specified in claim 1, incorporating a food tray formed integrally with the block, the latter being formed with a hole extending through it from the underside of the block and constituting the entrance end of the passage-way for the bees to the feeding space zones.

10. A bee feeder as specified in claim 2, wherein the passage-way in the block leads to two separate feeding space zones at the surface of contact of the food with the block, one extending along two adjacent sides of the block and the other being provided by a groove in one of said sides extending downwardly from the top thereof, the first of which zones is of a width along the surface of the food sufficient to permit a plurality of bees to feed in the zone simultaneously and the second is of a width sufficient to permit only one bee to feed in the zone at a time, the said passage-way comprising at its entrance end a hole extending up through the block and communicating in common with the two feeding space zones by way of a recess cut away in the top of the block and leading from the outlet of the hole therein to the upper edges of the said sides of the block and to the top of the said groove, and the cap being arranged in one position upon the block to close off from the said recess the wider feeding space zone which extends along two adjacent sides of the block while opening the other zone thereto, by abutting said sides of the block along which the first zone extends and in another position to open both zones to the recess by being spaced from the said sides of the block.

ADAM CARL KEHRLE.